3,177,195
OLEFIN POLYMERIZATION PROCESS USING A CATALYST CONTAINING A NORMAL ALKYL BROMIDE

Alfred Steitz, Jr., Flossmoor, Ill., and Shelby P. Sharp, Tulsa, Okla., assignors to Standard Oil Company, Chicago, Ill., a corporation of Indiana
No Drawing. Filed Mar. 16, 1961, Ser. No. 96,074
9 Claims. (Cl. 260—94.9)

This invention relates to an improved process of polymerizing olefinic hydrocarbons to produce normally solid, high molecular weight polymers. The invention has particular reference to an improved process for preparation of polyethylene employing novel catalysts comprising essentially a supported oxide of a metal of Group 5a of the Periodic Table, an organometallic compound of aluminum and an alkyl bromide activator.

One object of our invention is to provide novel combinations of catalysts for the conversion of olefin hydrocarbons having a terminal vinyl group to high molecular weight polymers, especially normally solid polymers. Another object is to provide a low temperature, low pressure process for the conversion of terminal vinyl alkenes to high molecular weight, resinous materials characterized by high density and crystallinity. Yet another object is to provide processes for the copolymerization of terminal vinyl alkenes mixed with various comonomers to produce resinous products. A more specific object is to provide a low temperature, low pressure process for the conversion of ethylene to a high molecular weight, resinous material having improved processability.

The inventive process comprises the conversion of terminal vinyl alkenes to high molecular weight, normally solid polymers by contact with a catalyst comprising a supported oxide of metal of Group 5a of the Periodic Table and, as co-catalyst, organometallic aluminum compounds conforming to the general formula $AlR_nX_{3-n}$ wherein the R groups are the same or different monovalent hydrocarbon radicals, X stands for a halogen atom and $n$ has a value of from 1 to 3 in the presence of an alkyl bromide activator. The polymerization or copolymerization process can be effected at suitable temperatures within the range of about 25° C. to about 300° C. and pressures ranging upwardly from atmospheric to any desired maximum pressure, for example, 15,000; 30,000 p.s.i.g. or even higher pressures, suitably pressures between about atmospheric and about 1000 p.s.i.g.

We have found that when the polymerization of ethylene is effected in an inert liquid reaction medium in the presence of a Group 5a metal oxide catalyst and hydrocarbon aluminum co-catalyst, especially at a temperature below about 120° C., the resulting polymer is of extremely high molecular weight. Such ethylene polymers having an intrinsic viscosity (as measured in Decalin at 130° C.) of 15–30 deciliters/gram are extremely difficult to handle in usual processing operations, such as milling or extrusion operations for the productions of plastic articles of manufacture.

In accordance with the invention described herein, polymerization of ethylene is effected in the presence of an activator selected from the group consisting of n-alkyl bromides having from 1 to 6 carbon atoms in the alkyl group. While organic halides have hitherto been employed for reducing the molecular weight of polymers obtained by polymerization with metallic salts of transition metal compounds, we have found that n-alkyl bromides are unique when employed as activators with the particular catalyst system described herein, in their ability to provide a polymer of reduced molecular weight while acting as polymerization promoters, resulting in substantially improved yields of desired polymer.

In conjunction with the research program which established the surprising advantages of the particular activators described above, a wide variety of organic halides were tested for their activating effect on the vanadium pentoxide-hydrocarbon aluminum catalyst system. Most of the halides depressed the polymer yield, and it was found that tertiary and secondary halides were the strongest polymerization inhibitors. Primary halides as a class were not effective, the unusual combination of improved yield and lowered molecular weight being characteristic only of the n-alkyl bromides.

The n-alkyl halide employed as an activator and molecular weight depressant in accordance with our invention can contain from 1 to 6 carbon atoms in the alkyl group, including for example, methyl bromide, ethyl bromide, n-butyl bromide and n-hexyl bromide. Polymerization of ethylene is effected in an inert liquid reaction medium, to which the alkyl bromide is added in an amount of from about 1 to 50 volume percent, preferably from about 5 to 20 volume percent based on total liquid volume. The polymers of ethylene which are obtained by this process have intrinsic viscosity in the range of 5–15 dl./g. (as measured in Decalin at 130° C.), density in the range of about 0.96 to 0.97 and melting points above about 125° C.

The proportion of Group 5a metal oxide catalyst (including the catalyst support), with respect to the olefin charging stock, may vary from about 0.001 to about 20 weight percent, being not usually a critical feature of our process. The proportion of $AlR_nX_{3-n}$ compound, based on the olefinic charging stock, can be varied within the range of about 0.001 to about 20 weight percent, the precise proportion selected for use being dependent upon the desired rate of polymerization, the concentration of contaminants in the olefinic feedstock which tends to react with or destroy the hydrocarbon aluminum halide, the particular olefin-containing charge stock, temperature and other reaction variables.

It is desirable to supply to the reaction zone a liquid medium which serves both as a transport medium for solid products and as a solvent for the olefin feedstock and organo-metallic co-catalyst. Suitable liquid reaction media for polymerization include various hydrocarbons, e.g. liquid paraffins such as n-heptane or octanes or aromatic hydrocarbons such as benzene, toluene or xylenes.

The liquid hydrocarbon reaction medium should be freed of poisons before use in the present invention by acid treatment, e.g. with anhydrous p-toluene sulfonic acid, sulfuric acid, or by equivalent treatments, for example with aluminum halides, or other Friedel-Crafts catalysts, maleic anhydride, calcium, calcium hydride, sodium or other alkali metals, alkali metal hydrides, lithium aluminum hydride, hydrogen and hydrogenation catalysts (hydrofining), filtration through a column of copper grains or 8th group metal, etc., or by combinations of such treatments. The polymerization can be effected in the absence of a liquid reaction medium or solvent and solid catalyst containing accumulated solid polymers can be treated from time to time, within or outside the conversion zone, to effect removal of polymers therefrom and, if necessary, reactivation or regeneration of the catalyst for further use.

The charging stock to the present polymerization process comprises a terminal vinyl alkene of from two to about eight carbon atoms having the structure $$RCH{=}CH_2$$ 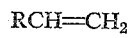

wherein the R group may be hydrogen or a straight, or branched chain aliphatic radical of from 1 to 6 carbon atoms. Ethylene is a particularly preferred feedstock. Examples of other olefinic hydrocarbons which are suitable feedstocks for the present process include propylene, n-butene, 3-methyl-1-butene, 4-methyl-1-pentene, n-hexene and the like. Mixtures of these olefins, especially such mixtures containing ethylene as one component, can be employed for preparation of copolymers.

The process of the present invention can be employed to effect copolymerization of the terminal vinyl olefin with other polymerizable materials, e.g. conjugated diolefinic hydrocarbons such as butadiene, isoprene, and the like; styrene, Ar-alkyl styrenes; various vinyl compounds such as tetrafluoroethylene, perfluorovinyl chloride and the like. When comonomers are employed with the principal charging stock, their proportions may range between about 1 and about 25% by weight, based on the weight of the principal olefin charging stock, such as ethylene, although some comonomers such as butadiene or styrene may be used in proportions up to 95% by weight of the total olefin feedstock.

The oxide catalyst ingredients employed in the present invention are those of metals of Group 5a of the Periodic Table, viz. V, Nb, Ta, or mixtures thereof. The Group 5a oxides are preferably extended upon suitable supports and may be pentoxides. The supported Group 5a oxides are calcined in air at temperatures between about 250° and about 700° C. before use to minimize the concentration of water or hydroxy groups in the catalysts and/or supports. Probably even the chemical structures as well as the physical characteristics of the catalysts are affected by the high temperature calcination.

The Group 5a oxide can be at least partially pre-reduced before use and preferably before contact with the $AlR_nX_{3-n}$ co-catalyst by the use of various reducing agents such as hydrogen, saturated hydrocarbons, CO, $H_2S$ or their equivalents.

The Group 5a catalyst or catalysts employed in the present invention can comprise $V_2O_5$, $VO_2$, $V_2O_3$, $VO$; $Nb_2O_5$, $NbO_2$, $NbO$; $Ta_2O_5$, $TaO_2$ and the like. We prefer to employ as Group 5a catalysts the oxides of vanadium.

The Group 5a or 6a metal oxide can be extended upon suitable supports (having surface areas, for example, between about 1 and about 1500 square meters per gram), for example, difficultly reducible metal oxides such as alumina, magnesia, titania, zirconia, silica or their composites e.g., synthetic aluminosilicates, clays and the like. In some instances, it may be desired to employ a relatively low surface area support, of which variety are known in the art, including tabular alumina, various fused silicates, silicon carbide, diatomaceous earths; various metals, preferably treated to produce a relatively thin surface coating of the corresponding metal oxide thereon, such as iron or steel containing a slight iron oxide coating or aluminum carrying a surface coating of aluminum oxide, e.g., as an anodized aluminum. We may also employ relatively high surface area, relatively non-porous supports or carriers for the Group 5a or 6a metal oxide such as kaoline, zirconium oxide, iron oxide pigments, carbon black or the like. Silica gel is a particularly preferred support for vanadia containing catalyst.

The relative proportion of support to the catalytic metal oxide is not critical and may be varied throughout a relatively wide range such that each component is present in amounts of at least approximately 1 weight percent. The usual metal oxide support ratios are in the range of about 1:20 to 1:1, or approximately 1:10. We may employ metal oxide catalysts consisting of a supporting material containing about 1 to 80 weight percent, preferably about 5 to 35%, or approximately 1–10% of vanadia or other Group 5a catalytic metal oxide supported thereon.

The Group 5a metal oxide can be incorporated in the catalyst support in any known manner, for example, by impregnation, co-precipitation, co-gelling and/or absorption techniques which are well known in the catalyst art. A brief review of the art of preparing supported vanadium oxide catalysts is presented in "Catalysis," edited by Dr. Paul H. Emmett (published by Reinhold Publishing Corp., New York (1954), vol. 1, pages 328–329). Similar preparative methods can be employed to produce catalysts comprising oxides of neodymium and tantalum, or catalysts comprising oxides of more than one Group 5a metal.

The proportion of Group 5a metal oxide catalyst (including support), based on the weight of the mono-olefinic charging stock, can range upwardly from about 0.001 weight percent to 20 weight percent or even more. In a polymerization operation carried out with a fixed bed of catalyst, the catalyst concentration relative to olefin can be very much higher. The efficiency of the supported metal oxide catalysts is extremely high in the presence of $AlR_nX_{3-n}$ co-catalysts, so that said metal oxide catalysts can be employed in very small proportions, based on the weight of charging stock, for example, between about 0.01 and about 10 weight percent, while maintaining high conversion efficiency.

The $AlR_nX_{3-n}$ compounds which can be used in practicing our invention comprise the mixed organo-metallic compounds of aluminum wherein $n$ may have a value from 1 to 3. When $n$ has a value of 2, the R groups may be the same or different monovalent hydrocarbon radicals. Examples of suitable R groups include aryl radicals saturated or unsaturated aliphatic hydrocarbon radicals or cycloalkyl radicals, or derivatives thereof including alkaryl, aryl-alkyl, alkyl-cycloalkyl and the like. Specific examples of R groups which may be substituted in the above formula include methyl, ethyl, propyl, isoamyl, cyclohexyl, methylcyclohexyl, 2-butenyl phenyl, tolyl, phenylethyl and the like. The X group is a halogen selected from the group consisting of fluorine, bromine, chlorine and iodine. Where more than one halogen atom is present, they may be the same or different, but it is preferred that they be the same for simplicity in preparation and economical considerations. It is preferred to use a halogen having an atomic number above 9.

The aluminum containing organometallic co-catalyst may comprise a single compound of the formula above, or may comprise a mixture of such compounds; for example, sesquihalides comprising a mixture of compounds of formula $AlR_2X$ and $AlRX_2$ which mixtures are readily prepared by methods well known in the art. The hydrocarbon aluminum halide co-catalyst may be added to the polymerization reactor as such, or may be prepared in situ by addition of the required amounts of aluminum metal and aluminum trihalide, which are known to react in the presence of added olefin to form sesquihalides of aluminum.

The proportion of $AlR_nX_{3-n}$ co-catalyst, based on the weight of the olefinic charging stock, can range from about 0.001 to 20 weight percent or even more, although it is usually employed in proportions between about 0.001 and about 10 weight percent, e.g. usually about 0.01 to about 5 weight percent.

It is desirable to minimize or avoid the introduction of water, oxygen, carbon dioxide, acetylene or sulfur compounds into contact with the catalyst or co-catalyst. Any known means may be employed to purify the olefinic charging stocks of these materials prior to their introduction into the polymerization reactor.

The contact time or space velocity employed in the polymerization process will be selected with reference to the other process variables, catalysts, the specific type of product desired and the extent of olefin conversion desired in any given run or pass over the catalyst. In general, this variable is readily adjustable to obtain the desired results. The operations in which the olefin charging stock is caused to flow continuously into and out of contact with the solid catalyst, suitable liquid hourly space velocities are usually between about 0.1 and about 10 volumes, preferably about 0.5 to 5 or about 2 volumes of olefin solution in a liquid reaction medium. The amount of olefin in such solutions may be in the range of about 2 to 50% by weight, preferably about 2 to about 15 weight percent or, for example, about 5 to 10 weight percent.

The following specific examples are introduced as illustrations of our invention and should not be interpreted as an undue limitation thereof.

EXAMPLE 1

A series of polymerization runs was effected employing chemically pure ethylene gas (Mathieson Company) which was dried by passing through a drying tube containing Drierite, calcium hydride and Alcoa F-1 alumina. Solvent consisted of Phillips 99 mole percent n-heptane, purified by washing with sulfuric acid, water, caustic solution and finally water till neutral. The solvent was dried by percolation through silica gel and stored over calcium hydride in a nitrogen atmosphere.

The solid catalyst was prepared by dissolving ammonium vanadate (meta) in distilled water and mixing with the appropriate quantity of Davison Grade 62 silica gel (60/200 mesh). The water was evaporated at 75–85° C. under a vacuum of 50 mm. The catalyst was ball-milled for 16 hours, then calcined in an atmosphere of air for 14–16 hours at 505–510° C. The catalyst contained 7 weight percent vanadia.

Polymerization in each run was effected in Fischer-Porter glass reactor bottles which were dried by heating under vacuum prior to each run. Calcined catalyst, solvent and hydrocarbon aluminum co-catalyst were charged, and the reactor then charged with ethylene to the desired pressure. All runs were initiated at room temperature and allowed to rise in temperature as the small exothermic heat of reaction affected the reaction mixture. A run time of six hours was used in most cases.

All yields were calculated as grams of product per gram of total catalyst used. Total catalyst included hydrocarbon aluminum and metal oxide catalyst plus support, but did not include added alkyl halide.

Unless otherwise indicated, 0.1 g. of solid catalyst (comprising 7 weight percent $V_2O_5$ on silica) was employed in 100 ml. of heptane; 10 ml. of organic halide and 0.4 g. of aluminum triisobutyl were added, and the pressure throughout the run maintained at 75 p.s.i.g. by pressuring in ethylene as required.

sesquibromide (an equimolar mixture of dimethylaluminum bromide and methylaluminum dibromide) and the reactor pressured at 75 p.s.i.g. with ethylene. The reactor contents were stirred over a period of 5.75 hours, the maximum temperature reached being 47° C. Solid polyethylene was recovered in an amount of 4.4 g. having an intrinsic viscosity (measured in decalin at 130° C.) of 10.8. The yield of polymer was 79.8 g./g. of catalyst.

EXAMPLE 3

In a similar manner, ethylene is polymerized in a series of runs by means of 7 weight percent vanadia on silica catalyst in the presence of aluminum triisobutyl co-catalyst employing heptane solvent contaning (a) 10 volume percent methylbromide, (b) 10 volume percent ethylbromide, and (c) 10 volume percent n-hexylbromide. In each instance high yields of polyethylene having instrinsic viscosity in the range of 10–15 dl./g. (measured in decalin at 130° C.) are obtained. Other aluminum trialkyl compounds, including aluminum triethyl, aluminum triphenyl can be substituted for the aluminum triisobutyl with equal effectiveness.

The polymeric products produced by the processes encompassed within the scope of our invention can be subjected to a variety of treatments designed to remove all or part of the catalytic materials therefrom.

Thus, the hot polymeric solutions can be filtered for removal of solid catalyst, or the polymer can be extracted from the solid catalysts employed in the polymerization operation. The extracted polymer can be washed with water, methanol, alcoholic solutions of mineral acid, e.g. methanolic HCl or the like to remove traces of residual catalytic materials. Hot acetic acid extraction of ash from the polymers can also be practiced.

The polymers produced by the process of this invention can be subjected to such after-treatment as may be desired to fit them for particular uses or to impart desired properties. Thus, the polymers can be extruded, mechanically milled, filmed or cast, or converted to sponges or latices. Antioxidants, stabilizers, fillers, extenders, pigments, etc. may be incorporated in the polyethylenes. The polyethylenes may be employed as coat-

Table

| Run No. | Organic Halide Type | Organic Halide | Temp., ° C. | Time, Hrs. | Product | | | |
|---|---|---|---|---|---|---|---|---|
| | | | | | Net Wt., g. | Rate, g./g./hr. | Yield, g./g. | Intrinsic [1] Viscosity |
| 1 | None | | 25–42 | 4.0 | 10.4 | 5.2 | 20.9 | 25.8 |
| 2 | $CX_4$ | $CCl_4$ | 25–30 | 5.5 | 2.6 | 0.8 | 5.2 | 13.4 |
| 3 | $HCX_3$ | $HCCl_3$ | 25–32 | 5.25 | 2.1 | 0.3 | 1.2 | (2) |
| 4 | $HCX_3$ | $HCBr_3$ | 25–77 | 5.0 | 0.2 | 0.1 | 0.4 | |
| 5 | $CH_3X$ | $CH_3I$ | 27–30 | 6.5 | 1.3 | 0.4 | 2.6 | 16.5 |
| 6 | $XCH_2CH_2X$ | $ClCH_2CH_2Cl$ | 27–30 | 4.7 | 8.7 | 3.8 | 17.5 | 27.5 |
| 7 | $R-CH_2X$ | $CH_3(CH_2)_3Cl$ | 35–50 | 4.7 | 10.3 | 4.4 | 20.8 | 12.2 |
| | $R-CH_2X$ | $CH_3(CH_2)_3Br$ | 29–102 | 2.5 | 29.3 | 23.6 | 59.1 | 11.2 |
| | $R-CH_2X$ | $CH_3(CH_2)_3I$ | 28–80 | 6.0 | 10.9 | 3.7 | 22.2 | 24.0 |
| 8 | R—CH—R, X | $CH_3CH_2-\underset{Cl}{CH}-CH_2CH_3$ | 25–25 | 6.0 | 1.0 | 0.3 | 2.0 | 8.0 |
| 9 | $R_3-C-X$ | $CH_3-\underset{Cl}{\overset{CH_3}{C}}-CH_3$ | 25–26 | 6.0 | 0 | 0 | 0 | |
| 10 | $\phi X$ | $\phi Cl$ | 25–25 | 6.0 | 3.5 | 1.2 | 7.1 | 28.4 |
| | $\phi X$ | $\phi Br$ | 26–30 | 6.0 | 4.5 | 1.5 | 9.1 | 11.3 |
| | $\phi X$ | $\phi I$ | 27–40 | 6.0 | 14.5 | 4.9 | 29.2 | 23.4 |
| 11 | $\phi CH_2X$ | $\phi CH_2Br$ | 25–35 | | 7.1 | | 14.3 | (3) |

[1] Intrinsic Viscosity measured in decalin at 130° C.
[2] Polymerization effected with 1.0 g. solid catalyst plus 0.8 g. Al (i-butyl)₃ in 200 ml. solvent.
[3] Instantaneous reaction—polymer completely insoluble in decalin.

EXAMPLE 2

In accordance with the procedure of Example 1, a Fisher-Porter glass reactor was charged with 0.013 g. of a solid catalyst comprising 7 weight percent vanadia on silica dispersed in 150 ml. dry heptane containing 10 ml. n-butyl bromide. To this was added 0.042 g. methylaluminum ing materials, gas barriers, binders, etc. in a manner known for polyethylenes made by prior processes.

Polymers produced by the present process can be subjected to chemical modifying treatments, such as halogenation, halogenation followed by dehalogenation, sulfohalogenation by treatment with sulfuryl chloride or mixtures of chlorine and sulfur dioxide, sulfonation and other reactions to which hydrocarbons, especially polyethylenes, may be subjected.

Having described our invention, what we claim is:

1. A process for the polymerization of ethylene to a normally solid polyethylene which comprises contacting ethylene under polymerization conditions with a catalyst consisting essentially of a supported oxide of a metal of Group 5a of the Periodic Table and a hydrocarbon aluminum compound having the formula $AlR_nX_{3-n}$ wherein R is a monovalent hydrocarbon radical, X is a halogen and $n$ has a value from 1 to 3, said contacting being effected in an inert hydrocarbon reaction medium containing from about 1 to about 50% by volume of a normal alkyl bromide having from 1 to 6 carbon atoms in the alkyl group, and separating solid polyethylene having an intrinsic viscosity (as measured in decalin at 130° C.) of from about 5 to about 15 dl./g.

2. The process of claim 1 wherein ethylene is polymerized under superatmospheric pressure and a temperature between about 25° C. and about 300° C.

3. The process of claim 1 wherein said oxide is an oxide of vanadium and said hydrocarbon aluminum compound is a trialkylaluminum.

4. The process of claim 1 wherein said oxide is an oxide of vanadium and said hydrocarbon aluminum compound is an alkylaluminum sesquihalide.

5. A process for the polymerization of ethylene to a normally solid polymer having an intrinsic viscosity (measured in decalin at 130° C.) between about 5 and about 15 dl./g. which comprises contacting ethylene under polymerization conditions including a temperature between about 25° C. and about 120° C. and a pressure between atmospheric and about 1000 p.s.i.g. with a solid catalyst consisting essentially of an oxide of vanadium supported upon silica and a hydrocarbon aluminum compound having the formula $AlR_nX_{3-n}$ wherein R is a monovalent hydrocarbon radical, X is a halogen and $n$ has a value from 1 to 3, said contacting being effected in an inert hydrocarbon reaction medium containing from about 5 to about 20 volume percent, based on total liquid volume, of a normal alkyl bromide having from 1 to 6 carbon atoms in the alkyl group, and separating said polymer therefrom.

6. The process of claim 5 wherein said solid catalyst comprises from 1 to about 10 weight percent vanadia.

7. The process of claim 5 wherein said normal alkyl bromide is n-butyl bromide.

8. The process of claim 7 wherein said hydrocarbon aluminum compound is aluminum triisobutyl.

9. The process of claim 7 wherein said hydrocarbon aluminum compound is methyl aluminum sesquihalide.

References Cited by the Examiner

UNITED STATES PATENTS

| | | | |
|---|---|---|---|
| 2,839,519 | 6/58 | Seed | 260—94.9 |
| 2,912,419 | 11/59 | Peters et al. | 260—93.7 |

FOREIGN PATENTS

| | | |
|---|---|---|
| 790,399 | 2/58 | Great Britain. |

WILLIAM H. SHORT, *Primary Examiner.*

L. H. GASTON, JOSEPH L. SCHOFER, J. R. LIBERMAN, *Examiners.*